(12) United States Patent
Mori

(10) Patent No.: US 7,861,965 B2
(45) Date of Patent: Jan. 4, 2011

(54) REEL AND RECORDING CARTRIDGE

(75) Inventor: Yasuhiro Mori, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/379,691

(22) Filed: Feb. 26, 2009

(65) Prior Publication Data

US 2009/0218431 A1 Sep. 3, 2009

(30) Foreign Application Priority Data

Feb. 29, 2008 (JP) ............... 2008-050770

(51) Int. Cl.
*B65H 75/08* (2006.01)
(52) U.S. Cl. .................... 242/613.4; 242/348
(58) Field of Classification Search ............ 242/613, 242/613.4, 118.31, 348, 345.2; 360/132
See application file for complete search history.

(56) References Cited

U.S. PATENT DOCUMENTS

| 6,257,519 | B1 | 7/2001 | Willems et al. | |
|---|---|---|---|---|
| 7,300,016 | B2* | 11/2007 | Brown et al. | 242/613.4 |
| 7,347,397 | B2* | 3/2008 | Ishikawa et al. | 242/613.4 |
| 7,523,887 | B2* | 4/2009 | Ishikawa | 242/613.4 |
| 7,533,840 | B2* | 5/2009 | Sumiya et al. | 242/348 |
| 7,562,842 | B2* | 7/2009 | Ishikawa | 242/610.4 |
| 7,571,872 | B2* | 8/2009 | Shiga | 242/348 |
| 2003/0226924 | A1* | 12/2003 | Morita | 242/348 |
| 2003/0226931 | A1* | 12/2003 | Morita | 242/610.4 |
| 2007/0272790 | A1 | 11/2007 | Ishikawa et al. | |
| 2007/0290090 | A1 | 12/2007 | Ishikawa | |
| 2008/0173749 | A1* | 7/2008 | Shiga | 242/407 |

FOREIGN PATENT DOCUMENTS

| JP | 2004014022 | 1/2004 |
|---|---|---|
| JP | 2005116163 | 4/2005 |

* cited by examiner

*Primary Examiner*—Evan H Langdon
(74) *Attorney, Agent, or Firm*—Jean C. Edwards, Esq.; Akerman Senterfitt

(57) ABSTRACT

The reel includes a reel hub that is made of a resin material and is formed into a cylindrical shape, an upper flange that is made of a resin material and is extended integrally outward in a radial direction from one end portion in an axial direction of the reel hub, and a reinforcement ring that is integrally disposed radially inside a tape take-up surface of the reel hub by insert molding and reinforces the reel hub in the radial direction. A position of an upper end of the reinforcement ring coincides with a position of an upper end of the tape take-up surface in the axial direction of the reel hub.

9 Claims, 8 Drawing Sheets

REEL AND RECORDING CARTRIDGE

CROSS-REFERENCE TO RELATED APPLICATION

This application claims priority under 35 USC 119 from Japanese Patent Application No. 2008-050770, filed Feb. 29, 2008, the disclosure of which is incorporated by reference herein.

BACKGROUND OF THE INVENTION

1. Technical Field

The present invention relates to a reel for winding a recording tape such as a magnetic tape, and a recording tape cartridge including such a reel.

2. Related Art

For example, as described in Japanese Patent Application Laid-Open (JP-A) No. 2005-116163 or No. 2004-14022, there has been known a technique in which a cylindrical insert body made of metal is attached to a reel hub made of resin to thereby assure the rigidity of the reel hub.

SUMMARY

However, in the related art technology as described above, there is no disclosure regarding a shape and the like in consideration of manufacturing a reel with an insert body for reinforcement attached to a reel hub, and in this respect, improvement is required.

The invention, in view of the above-described situation, provides a reel capable of assuring dimensional accuracy of a flange in a structure where a reinforcement ring is attached to a reel hub, and a recording tape cartridge capable of favorably protecting a recording tape by applying the reel.

A reel of a first aspect of the invention includes a reel hub that is made of a resin material and is formed into a cylindrical shape; a flange that is made of a resin material and is extended integrally outward in a radial direction from one end portion in an axial direction of the reel hub; and a reinforcement ring that is integrally disposed at an inner radial side of a take-up surface for a taken-up object of the reel hub by insert molding, and reinforces the reel hub in the radial direction, wherein a position of an end portion at the flange side in the reel hub axial direction of the reinforcement ring coincides with a position of an end portion at the flange side in the reel hub axial direction of the take-up surface of the reel hub.

BRIEF DESCRIPTION OF THE DRAWINGS

FIGS. 8A and 8B are diagrams each showing a reel according to a comparative example with the exemplary embodiment of the invention in an enlarged state, wherein FIG. 8A is a cross-sectional diagram of a first comparative example, and FIG. 8B is a cross-sectional diagram of a second comparative example.

DETAILED DESCRIPTION OF THE INVENTION

Referring to FIGS. 1 to 7, a reel 28 according to an example of an exemplary embodiment of the invention, and a recording tape cartridge 10 to which the reel 28 is applied are described. A schematic overall configuration of the recording tape cartridge 10 is first described, and subsequently, a configuration of the reel 28 is described in detail.

Figure 5A:
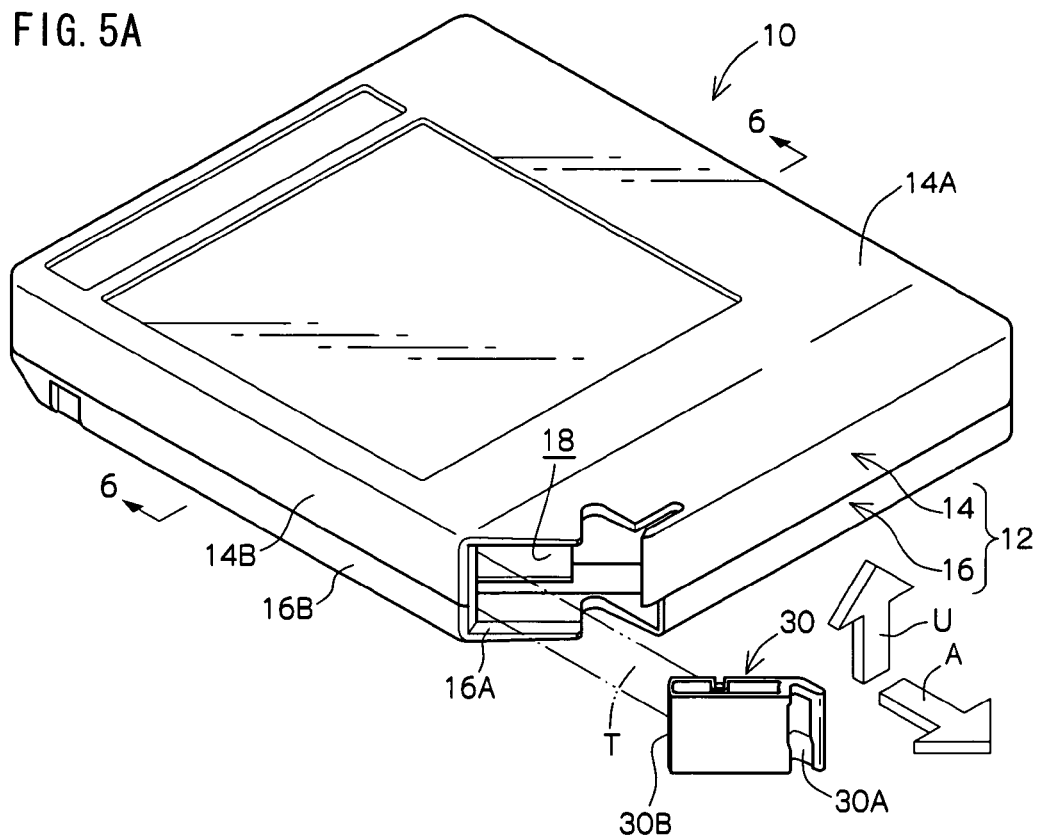
FIG. 5A is a perspective diagram when an exterior appearance of a recording tape cartridge to which the reel according to the exemplary embodiment of the invention is applied is seen from above.
Figure 5B:
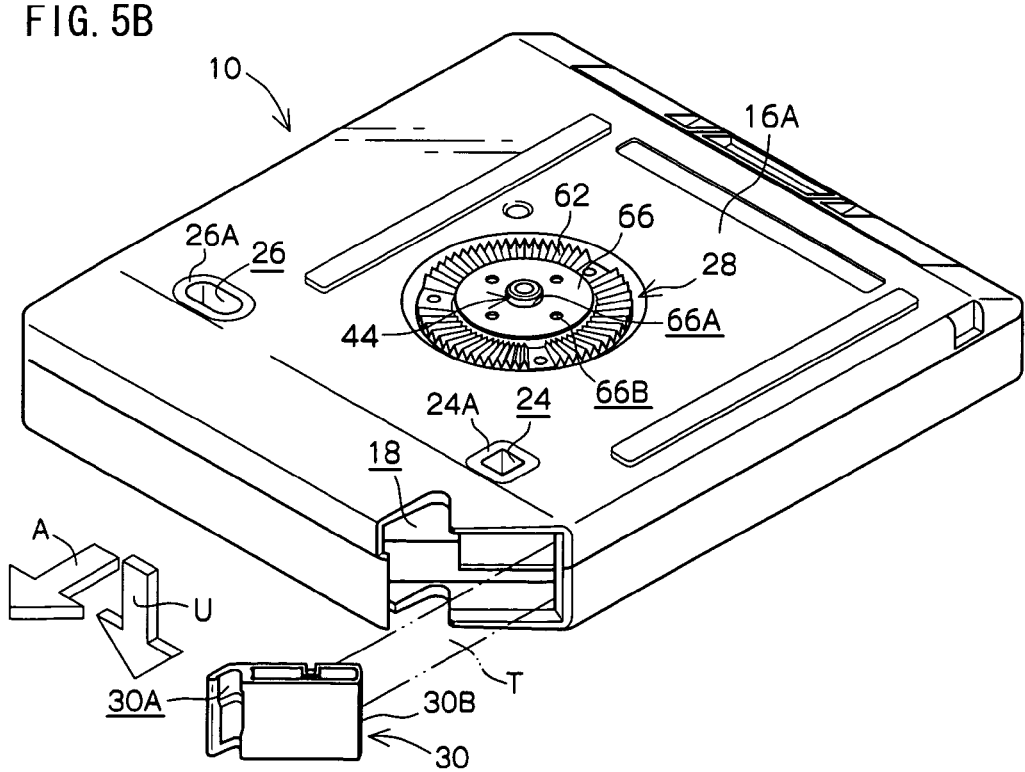
FIG. 5B is a perspective diagram when the same is seen from below.

In FIG. 5A, there is shown a perspective diagram where the recording tape cartridge 10 is seen diagonally from above, and in FIG. 5B, there is shown a perspective diagram where the recording tape cartridge 10 is seen diagonally from below. Further, in FIG. 6, there is shown a cross-sectional diagram along line 6-6 of FIG. 5A. It will be noted that arrow A shown in FIGS. 5A and 5B represents the direction in which the recording tape cartridge 10 is loaded into a drive device. In the following description, the direction represented by arrow A will be referred to as a front side for the sake of convenience. Further, the direction represented by arrow U will be referred to as an upper side.

As shown in these drawings, the recording tape cartridge 10 is disposed with a case 12. The case 12 is configured by joining together an upper case 14 and a lower case 16. Specifically, the upper case 14 is configured as a result of a substantially frame-like peripheral wall 14B being disposed upright along the outer edge of a top plate 14A that has a substantially rectangular shape when seen in plan view, and the lower case 16 is configured as a result of a substantially frame-like peripheral wall 16B being disposed upright along the outer edge of a bottom plate 16A having a shape substantially corresponding to that of the top plate 14A. The case 12 is formed in a substantially box-like shape when the upper case 14 and the lower case 16 are joined together by ultrasonic welding or with screws in a state where the open end of the peripheral wall 14B and the open end of the peripheral wall 16B have been brought into contact with each other.

An opening 18 that slants with respect to the loading direction is formed in the case 12 by cutting out corner portions of the top plate 14A, the peripheral wall 14B, the bottom plate 16A, and the peripheral wall 16B at the front side in the direction in which the recording tape cartridge 10 is loaded into the drive device. Further, a circular gear opening 20 that penetrates the bottom plate 16A is disposed in the substantially center portion of the bottom plate 16A and serves to expose a later-described reel gear 62. An annular rib 22 is disposed on the edge portion of the gear opening 20 in the bottom plate 16A so as to project inside the case 12 (see FIG. 6) and serves to position the later-described reel 28.

A pair of positioning holes 24 and 26 is formed in the outer surface of the bottom plate 16A in the vicinity of the front end of the case 12. The pair of positioning holes 24 and 26 are disposed sac-like inside projecting portions (not shown) disposed upright inside the case 12 from the bottom plate 16A and are arranged apart from each other on a hypothetical line orthogonal to the loading direction. The positioning hole 24 near the opening 18 has a substantially square shape when seen in bottom view that circumscribes a positioning pin of the drive device, and the positioning hole 26 is an elongate hole that is long along the hypothetical line and has a width corresponding to the diameter of a positioning pin. Thus, when the recording tape cartridge 10 is loaded into the drive device and the positioning pins are respectively inserted into the positioning holes 24 and 26, the recording tape cartridge 10 is accurately positioned in the horizontal direction (left and right, front and back) inside the drive device.

Moreover, the portions around the positioning holes 24 and 26 in the bottom plate 16A serve as positioning surfaces 24A and 26A that are finished more smoothly than the other portion (design surface) of the bottom plate 16A. The positioning surfaces 24A and 26A are configured to contact positioning surfaces of the drive device disposed around the positioning pins when the positioning pins are inserted into the positioning holes 24 and 26. Thus, the recording tape cartridge 10 is also positioned in the vertical direction inside the drive device.

Figure 6:
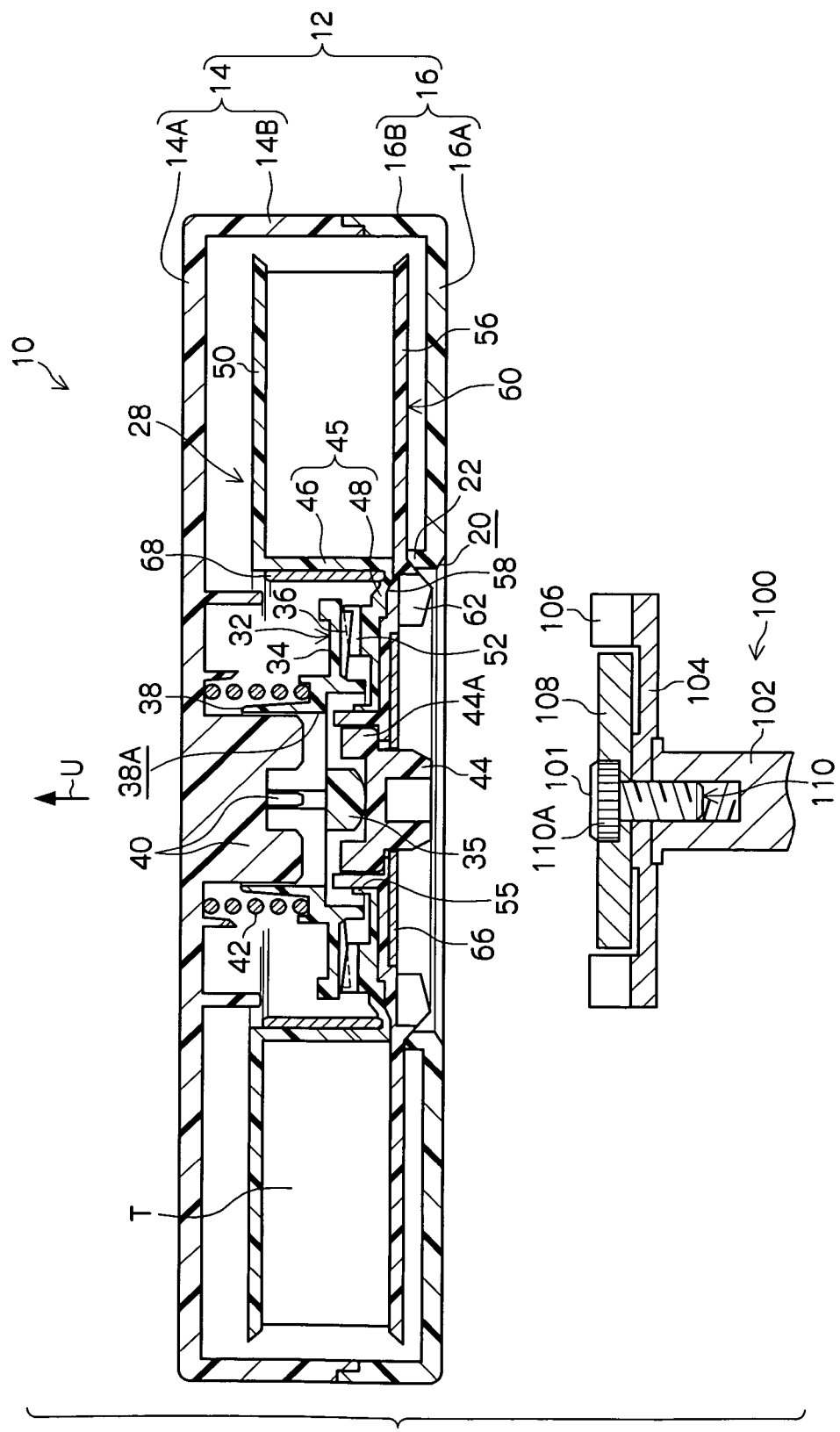
FIG. 6 is a cross-sectional diagram when rotation of the reel is locked in the recording tape cartridge to which the reel according to the exemplary embodiment of the invention is applied.
Figure 7:
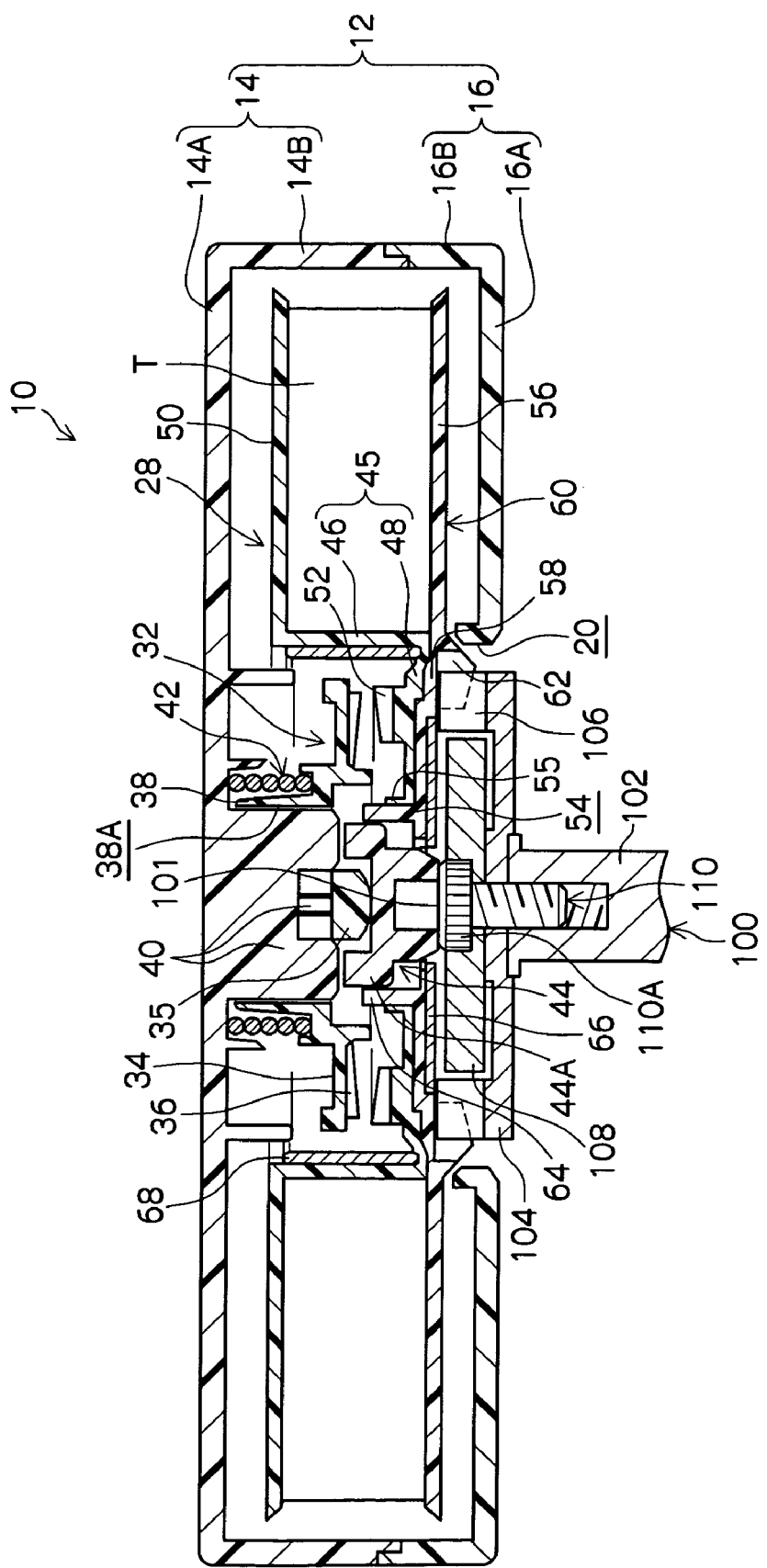
FIG. 7 is a cross-sectional diagram when rotation locking of the reel is released in the recording tape cartridge to which the reel according to the exemplary embodiment of the invention is applied.

As shown in FIG. 6, the reel 28 that will be described in detail later is rotatably housed inside the case 12 that has been described above. One reel 28 is disposed. Magnetic tape T serving as recording tape is wound onto the reel 28, and a leader block 30 serving as a pullout member is attached to the leading end of the magnetic tape T.

The leader block 30 is housed and held inside the opening 18 in the case 12 when the recording tape cartridge 10 is not in use. In this state, the leader block 30 blocks the opening 18 and deters the ingress of dust and the like into the case 12. Further, an engagement concave portion 30A is formed in the leading end of the leader block 30, so that when the magnetic tape T is to be pulled out inside the drive device, the leader block 30 is extracted from the case 12 by pullout means that engages with the engagement concave portion 30A and is guided to a take-up reel of the drive device. The end surface of the leader block 30 on the opposite side of the engagement concave portion 30A serves as a circular arc surface 30B and is fitted into the take-up reel to configure part of a take-up surface that takes up the magnetic tape T.

Further, the recording tape cartridge 10 is disposed with a brake member 32 for deterring rotation of the reel 28 when the recording tape cartridge 10 is not in use. The brake member 32 has as its main parts a disc portion 34 formed in a disc shape, a brake gear 36 formed facing downward on the peripheral edge portion of the disc portion 34, a cross-shaped projection 38 disposed so as to project upward from the axial center portion of the disc portion 34, and a slide-contact projecting portion 35 disposed so as to project downward from the axial center portion of the disc portion 34. An insertion groove 38A formed in a substantial cross shape when seen in plan view is formed in the cross-shaped projection 38 in correspondence to the shape of the cross-shaped projection 38, and a cross-shaped rib 40 disposed facing down from the top plate 14A is inserted into the insertion groove 38A so as to be capable of relative motion (sliding motion) in the up and down direction. Thus, the brake member 32 is configured to be incapable of rotation with respect to the case 12 and capable of relative motion in the up and down direction.

The brake gear 36 of the brake member 32 meshes with an engagement gear 52 disposed in a bottom plate 48 configuring the reel 28 (these will be described later) to thereby prevent rotation of the reel 28 with respect to the case 12, and the brake member 32 moves in the up and down direction (axial direction of the reel 28) with respect to the case 12 to thereby switch between a state where the brake gear 36 meshes with the engagement gear 52 and a state where the brake gear 36 disengages from the engagement gear 52. A compression coil spring 42 that energizes the brake member 32 toward the bottom plate 48 is disposed in the recording tape cartridge 10, and the brake gear 36 of the brake member 32 is always biased in a brake position where it is meshed with the engagement gear 52.

Further, the recording tape cartridge 10 is disposed with a clutch member 44 that penetrates the axial center portion of the bottom plate 48 of the reel 28 and is supported so as to be capable of coaxial and integral rotation with the reel 28, capable of relative displacement in the axial direction with respect to the reel 28, and incapable of falling out. The clutch member 44 is pressed by the slide-contact projecting portion 35 of the brake member 32 whose brake gear 36 is meshed with the engagement gear 52, so that part of the clutch member 44 projects outside (below) the reel 28. The brake member 32 is configured such that, when the slide-contact projecting portion 35 is pressed upward, the brake member 32 moves upward and reaches a release position where the meshing between the brake gear 36 and the engagement gear 52 is released.

In this embodiment, the clutch member 44 is configured to be pressed upward by a release surface 101 disposed in the axial center portion of a rotating shaft 100 of the drive device and to thereby cause the brake member 32 to move from the brake position to the release position.

To add more in regard to the rotating shaft 100, the rotating shaft 100 includes a rotating table 104 fixed to the upper end of a rotating axle 102, and a drive gear 106 capable of meshing with the reel gear 62 (described later) of the reel 28 is formed facing upward on the peripheral edge portion of the rotating table 104. Thus, the rotating shaft 100 is configured to move relatively upward with respect to the case 12 to thereby cause the drive gear 106 to mesh with the reel gear 62. Further, a disc-shaped magnet 108 is disposed on the radial direction inner side of the drive gear 106 on the rotating table 104, and the magnet 108 is fixed by a tap bolt 110 that penetrates the axial center portion of the magnet 108 and is screwed into the rotating axle 102. The aforementioned release surface 101 is configured by a head portion 110A of the tap bolt 110.

The recording tape cartridge 10 that has been described above is configured such that, during rotation of the reel 28 (when the magnetic tape T is being pulled out or taken up), relative rotation occurs between the slide-contact projecting portion 35 (the brake member 32) that does not rotate with respect to the case 12 and the clutch member 44 that rotates together with the reel 28, and the distal end (lower end) of the slide-contact projecting portion 35 and the upper surface of the clutch member 44 slide against each other because of this relative rotation.

(Configuration of Reel)

As shown in FIG. 1 to FIG. 4, the reel 28 is disposed with a reel hub 45 that configures the axial center portion of the reel 28. The reel hub 45 is formed in a substantially bottomed cylindrical shape including a cylindrical wall 46 whose outer peripheral surface serves as a tape take-up surface 46A for winding the magnetic tape T and a bottom plate 48 that blocks the lower portion of the cylindrical wall 46. An upper flange 50 is disposed so as to extend coaxially and integrally outward in the radial direction from an opening end 46B provided at the upper end of the cylindrical wall 46 of the reel hub 45. In this embodiment, the opening end 46B and an upper surface of the upper flange 50 are configured to be positioned at the same plane.

Further, the engagement gear 52 capable of meshing with the brake gear 36 of the brake member 32 is formed facing upward in the bottom plate 48 of the reel hub 45. That is, as described above, the engagement gear 52 is configured to mesh with the brake gear 36 of the brake member 32 positioned in the brake position and disengage from the brake gear 36 of the brake member 32 positioned in the release position to allow the reel 28 rotation about the axis of the reel 28. In this embodiment, the engagement gear 52 is formed such that its teeth are disposed annularly when seen in plan view.

Moreover, a through hole 54 that penetrates the bottom plate 48 in the plate thickness direction is formed in the axial center portion of the bottom plate 48 of the reel hub 45 and is configured to be able to allow part of the clutch member 44 to project therefrom. A short circular cylinder portion 55 serving as a cylindrical portion is disposed upright and faces upward from the peripheral edge portion of the through hole 54 in the bottom plate 48. The short circular cylinder portion 55 is formed integrally with the reel hub 45, and it is possible to understand that the short circular cylinder portion 55 has a turn-back shape with respect to the cylindrical wall 46.

Excluding the reinforcement ring 70 that will be described later, each portion of the reel hub 45 described above that has as its main portions the cylindrical wall 46, the bottom plate 48, the engagement gear 52 and the short circular cylinder portion 55 is formed integrally by resin molding. In this embodiment, the upper flange 50 is integrally formed with the reel hub 45 by resin molding.

Figure 2:
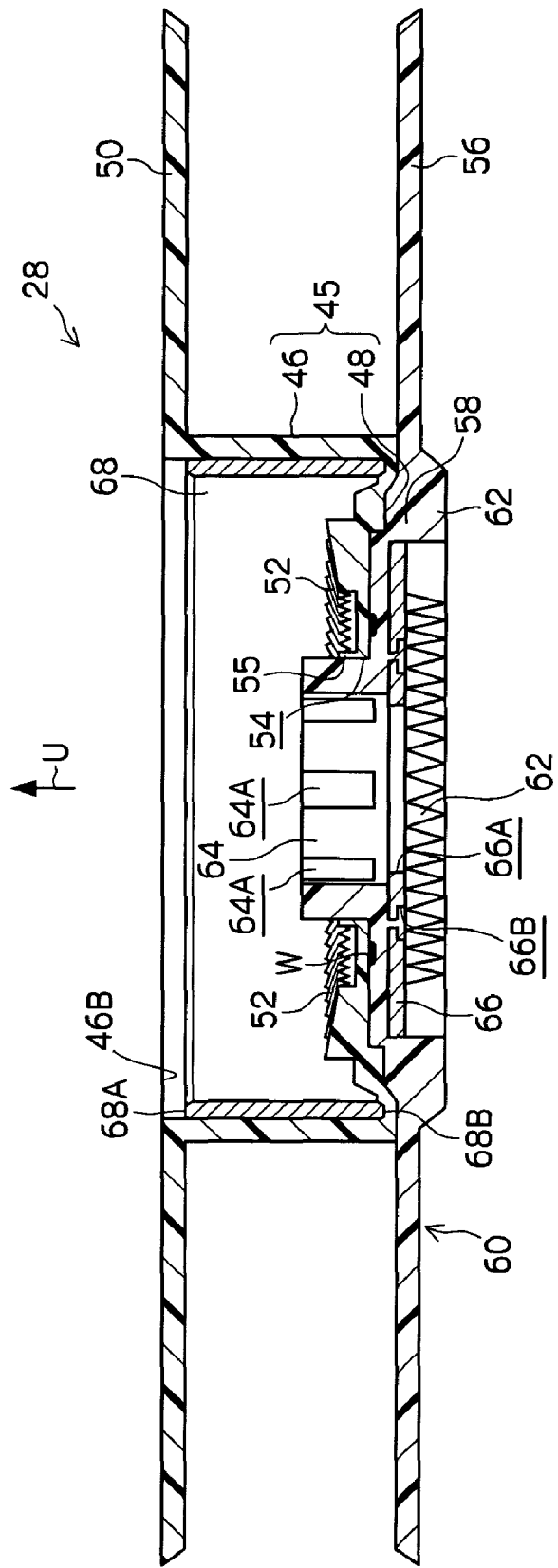
FIG. 2 is a cross-sectional diagram of the reel according to the exemplary embodiment of the invention.
Figure 3:
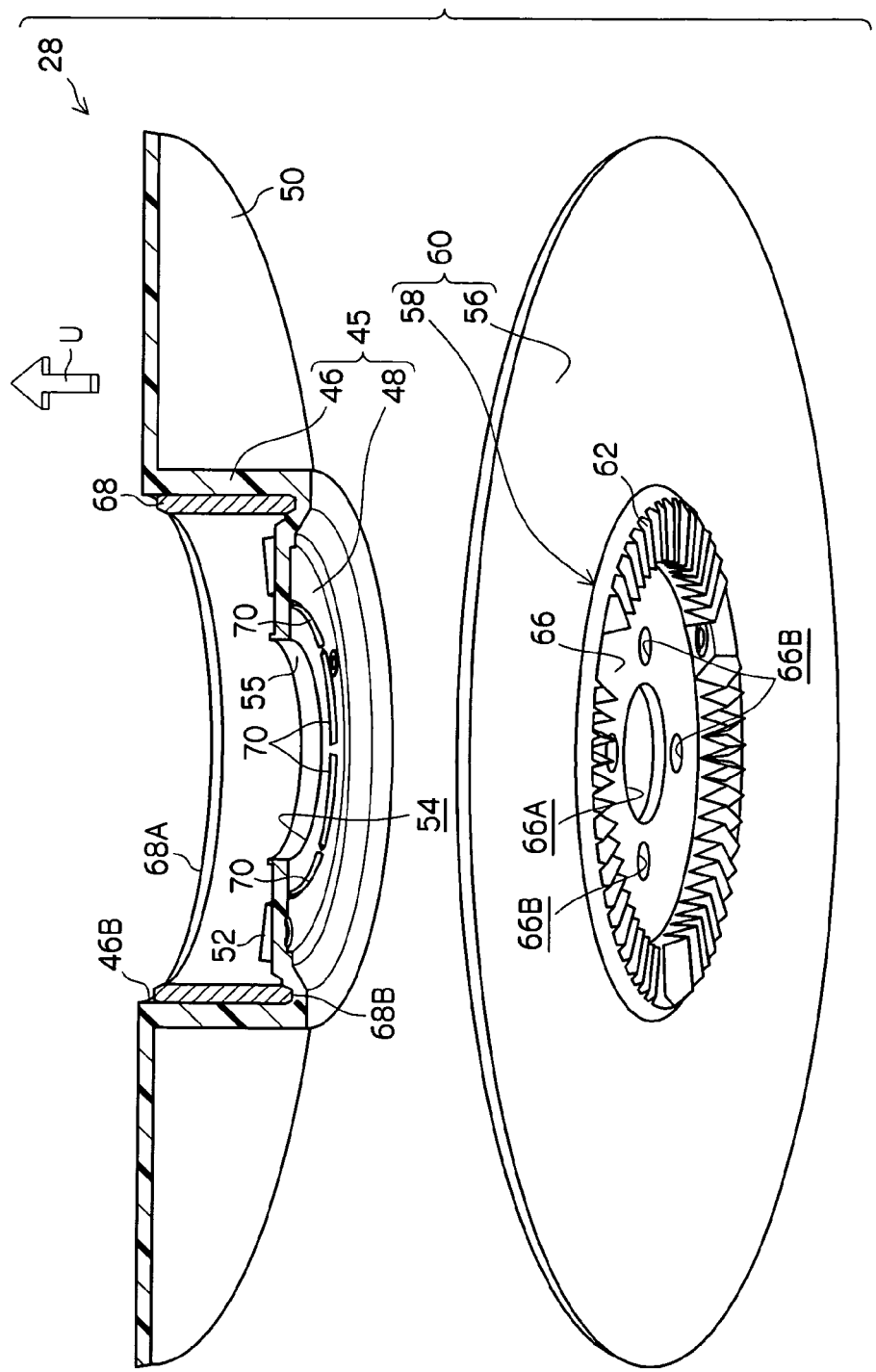
FIG. 3 is an exploded perspective diagram showing the reel according to the exemplary embodiment of the invention in a state where the reel is partially notched.
Figure 4:
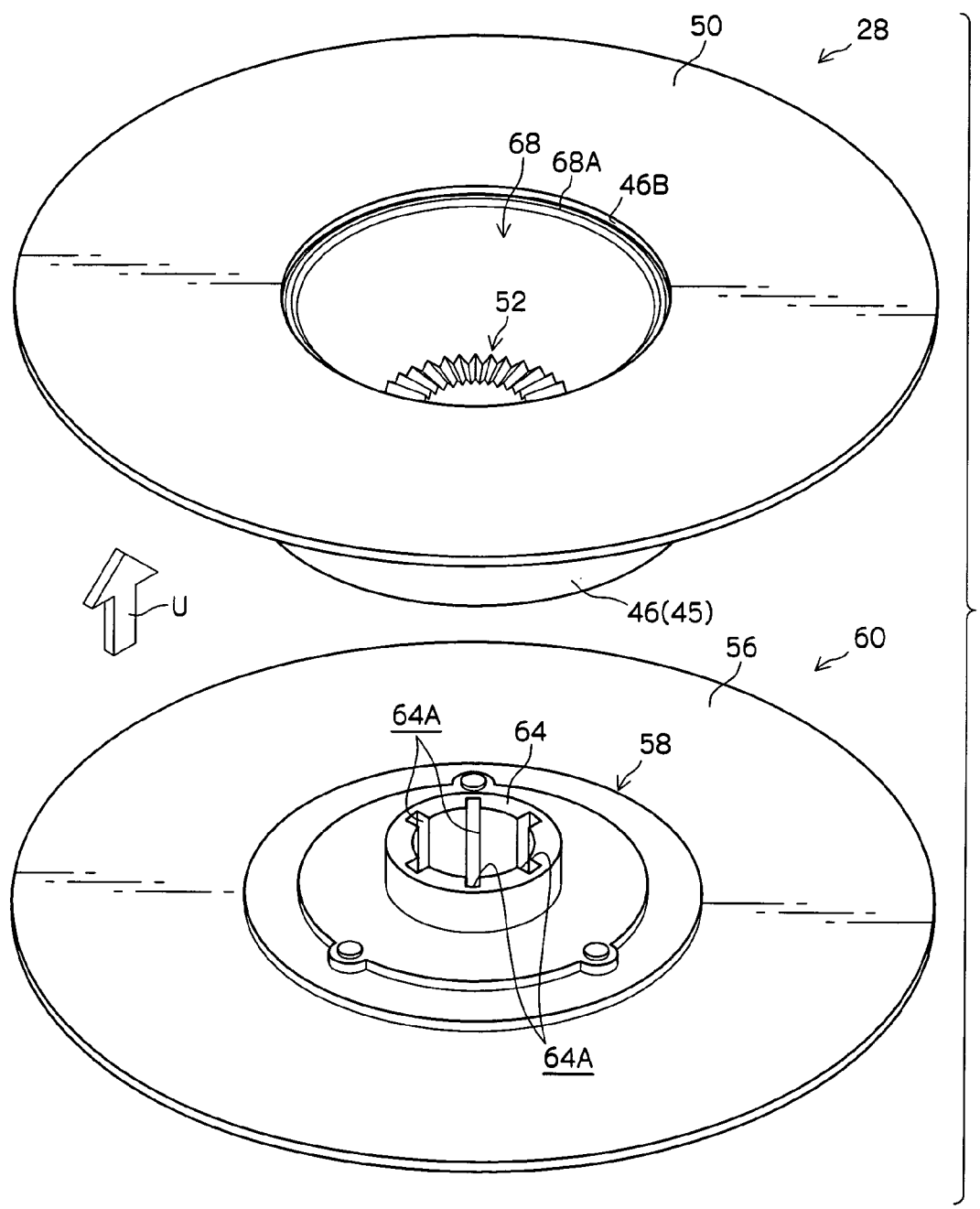
FIG. 4 is an exploded perspective diagram of the reel according to the exemplary embodiment of the invention when seen in a different direction from that of FIG. 1.

Further, a shown in FIG. 2 to FIG. 4, the reel 28 includes a lower flange 56 that faces the upper flange 50. The lower flange 56 is disposed so as to extend integrally outward in the radial direction from a center portion 58 that is joined together (this joint structure will be described later) with the bottom plate 48 of the reel hub 45, and the lower flange 56 is fixedly held to the reel hub 45 via this center portion 58. A lower flange member 60 serving as a flange member is configured by the lower flange 56 and the center portion 58.

The reel gear 62 capable of meshing with the drive gear 106 of the rotating shaft 100 of the drive device is formed facing downward in the center portion 58 of the lower flange member 60. The reel gear 62 is configured overall such that its plural teeth are arrayed so as to form an annular shape that is coaxial with the lower flange member 60—that is, the reel 28. It will be noted that the reel gear 62 may also be configured to include a region where teeth are not formed in part of its circumferential direction.

Further, as shown in FIG. 2 and FIG. 4, a clutch-use boss portion 64 for supporting the clutch member 44 is disposed upright to face upward from the axial center portion of the center portion 58. The clutch-use boss portion 64 is formed in a cylindrical shape, is configured such that slits 64A that allow plural engagement pieces 44A projecting radially from the upper portion of the clutch member 44 to enter are formed in its cylindrical wall, and supports the clutch member 44 such that the clutch member 44 is capable of sliding in the axial direction and is incapable of relative rotation and incapable of falling out at each slide position. The clutch-use boss portion 64 is configured such that its outer diameter substantially coincides with the inner diameter of the through hole 54—that is, the short circular cylinder portion 55—and to fit together with the short circular cylinder portion 55.

Each portion of the lower flange member 60 described above that has as its main portions the lower flange 56, the center portion 58, the reel gear 62 and the clutch-use boss portion 64 is formed integrally by resin molding.

Moreover, as shown in FIG. 2 and FIG. 3, a reel plate 66 serving as a metal plate comprising a magnetic body is fixedly disposed in the center portion 58. The reel plate 66 is formed in a substantial disc shape having a clear hole 66A in its axial center portion and is disposed coaxially in the radial direction inner side of the reel gear 62. The reel plate 66 is configured to be attracted by magnetic force to, but without contacting, the rotating table 104 of the rotating shaft 100 of the drive device.

The reel plate 66 is fixed to the center portion 58—that is, the lower flange member 60—by insert molding. Specifically, plural (in the present embodiment, four) small holes 66B disposed at equidistant intervals in the circumferential direction along a hypothetical circle coaxial with the clear hole 66A are formed in the reel plate 66 so as to penetrate the reel plate 66 in the plate thickness direction. The portion of each of the small holes 66B on the underside of the reel plate 66 serves as an enlarged diameter portion to configure a so-called pillbox shape. The reel plate 66 is strongly fixed to the lower flange member 60 as a result of a resin material that has been injected into a mold, filled each of the small holes 66B and being cooled and solidified. It will be noted that the reel plate 66 may also have a structure where it is fixed to the lower flange member 60 by caulking or the like.

The reel 28 according to the present embodiment has a reinforcement ring 68 integrally disposed at (internally fitted on) the inner circumferential side of the cylindrical wall 46 of the reel hub 45. The reinforcement ring 68 is made of metal and reinforces the cylindrical wall 46 of the reel hub 45 in the radial direction. Specifically, this reinforcement ring 68 is configured so as to restrain the cylindrical wall 46 having the opening end 46B from deforming in the direction where the cylindrical wall 46 falls inward in the radial direction by a winding pressure of the magnetic tape T.

In this embodiment, the reinforcement ring 68 is made of a drawn material of aluminum, aluminum alloy or the like, for example, and is integrated with the reel hub 45 by insert molding. A thickness of the reinforcement ring 68 is set to substantially 1 mm when aluminum or aluminum alloy is used. In contrast, a thickness of the reel hub 45 (mainly the cylindrical wall 46 of the reel hub 45) is set to 1 to 1.5 mm when a resin material such as polycarbonate (PC) is used. Reinforcement fiber such as glass fiber may be added to the PC composing the reel hub 45.

Figure 1:
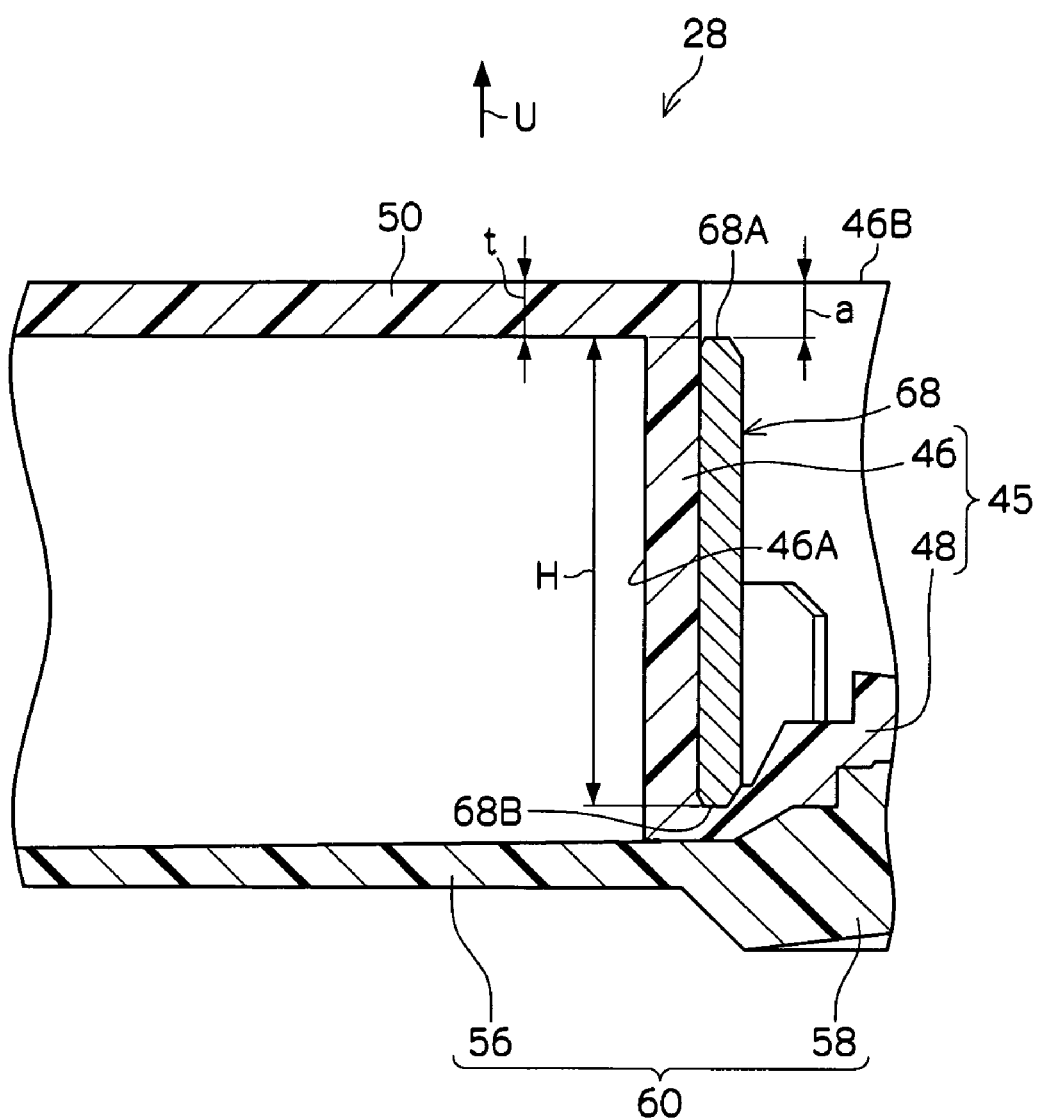
FIG. 1 is a cross-sectional diagram showing a substantial portion of a reel according to an exemplary embodiment of the invention in an enlarged state.

Moreover, as shown in FIG. 1, in the reel 28, an upper end 68A of the reinforcement ring 68 is located on the lower side (toward the bottom plate 48 side) by a predetermined amount 'a' with respect to the opening end 46B of the cylindrical wall 46. This predetermined amount 'a' is set as an amount equal to a thickness 't' of the upper flange 50 (a=t). In other words, the configuration is such that the reinforcement ring 68 does not exist in the range of the thickness 't' of the upper flange 50 in the axial direction of the reel hub 45 at the upper end side of the cylindrical wall 46 of the reel hub 45. The thickness t of the upper flange 50 is equivalent to a thickness of an inner end (base portion) in the radial direction of the upper flange 50. Accordingly, the upper end 68A of the reinforcement ring 68 substantially coincides with the upper end of the tape take-up surface 46A.

On the other hand, a lower end 68B of the reinforcement ring 68 reaches the vicinity of an upper surface of the lower flange 56, and in this embodiment, is buried in the bottom plate 48. In this embodiment, a height (length in the axial direction) H of the reinforcement ring 68 is set to 11.9 mm for the reel hub 45 (cylindrical wall 46) having the tape take-up surface 46A that takes up the magnetic tape T with a width of nominal 12.7 mm. Accordingly, the reinforcement ring 68 reinforces the cylindrical wall 46 from the inside in the radial direction across substantially the overall surface excluding the lower end portion (substantially 1 mm) of the tape take-up surface 46A.

Furthermore, in the reel 28, the lower flange member 60 is joined to the bottom plate 48 of the reel hub 45 at the center portion 58 as described above. Specifically, in this embodiment, as shown in FIG. 3, welding-use projections (energy directors) 70 are disposed so as to project from a lower surface of the bottom plate 48, and by applying ultrasonic oscillation in a state where the welding-use projections 70 have been brought into contact with an upper surface of the center portion 58, the reel hub 45 and the lower flange member 60 are ultrasonic-welded at placing portions of the welding-use projections 70. These welding portions are each shown by a reference sign W in FIG. 2. It may be seen from this figure that the reel hub 45 and the lower flange member 60 are joined together within the placing regions of the reel plate 66.

More specifically, the welding-use projections 70 are intermittently disposed along a virtual circle coaxial with the reel 28 so as to project, as shown in FIG. 3. This virtual circle (see the welding portions W) has a diameter smaller than those of the inner edges of the engagement gear 52 and the reel gear 62, and larger than an outer diameter of the clutch-use boss portion 64, and a diameter of a virtual circle in which the respective welding-use projections 70 are inscribed.

Now, an action of the exemplary embodiment is described.

When the recording tape cartridge 10 of the above-described configuration is not in use, the brake member 32 is positioned in the rotation lock position and the brake gear 36 is caused to mesh with the engagement gear 52 by the energizing force of the compression coil spring 42. For this reason, rotation of the reel 28 with respect to the case 12 is deterred. At this time, the reel gear 62 of the reel 28 is exposed from the gear opening 20, and the lower portion of the clutch member 44 projects from the clutch-use boss portion 64 and is exposed at the gear opening 20.

When the magnetic tape T is to be used, the recording tape cartridge 10 is loaded into a bucket (not shown) of the drive device along the direction of arrow A. Then, when the recording tape cartridge 10 is loaded a predetermined depth into the bucket, the bucket moves downward so that the rotating shaft 100 of the drive device relatively approaches (moves upward) the gear opening 20 in the case 12 and holds the reel 28. Specifically, the rotating shaft 100 attracts and holds, but does not contact, the reel plate 66 with the magnet 108 and causes the drive gear 106 to mesh with the reel gear 62.

In accompaniment with the drive gear 106 meshing with the reel gear 62, that is, the relative movement of the rotating shaft 100 in its axial direction toward the case 12, the rotating shaft 100 presses upward the clutch member 44 that is contacting with its release surface 101. Then, because of this pressing force, the clutch member 44 is guided in the slits 64A of the clutch-use boss portion 64 with its plural engagement pieces 44A and moves upward in the axial line direction of the reel 28 counter to the energizing force of the compression coil spring 42. Thus, the brake member 32 contacting the upper surface of the clutch member 44 with its slide-contact projecting portion 35 also moves upward, and the meshing between the brake gear 36 of the brake member 32 and the engagement gear 52 is released. That is, the brake member 32 reaches a relative rotation allowance position with respect to the reel 28. When the rotating shaft 100 further relatively moves upward, the reel 28 is lifted upward (without its relative position being caused to change) together with the clutch member 44 and the brake member 32 counter to the energizing force of the compression coil spring 42, the brake member 32 reaches an absolute (with respect to the case 12) rotation allowance position, and the lower flange 56 separates from the annular rib 22 (a tapered surface 22A). Due to the above, the reel 28 rises inside the case 12 and becomes rotatable without contacting the inner surface of the case 12.

Further, due to the lowering of the bucket, that is, the recording tape cartridge 10 inside the drive device, the positioning pins of the drive device respectively enter the positioning holes 24 and 26 in the case 12, and the positioning surfaces of the drive device come into contact with the positioning surfaces 24A and 26A of the case 12. Thus, the recording tape cartridge 10 is positioned in the horizontal direction and the vertical direction with respect to the drive device. Then, the pullout means of the drive device causes a pullout pin (not shown) to engage with the engagement concave portion 30A of the leader block 30, pull out the leader block 30 from the case 12, and guide the leader block 30 to the take-up reel of the drive device. Moreover, the leader block 30 is fitted into the take-up reel to configure part of the take-up surface that takes up the magnetic tape T.

In this state, when the leader block 30 rotates integrally with the take-up reel, the magnetic tape T is pulled out from the case 12 through the opening 18 while being taken up onto a reel hub of the take-up reel. At this time, the reel 28 of the recording tape cartridge 10 rotates synchronously with the take-up reel by the rotational force of the rotating shaft 100 that is transmitted by the drive gear 106 meshing with the reel gear 62. Then, a recording and playback head disposed along a predetermined tape path of the drive device records information to the magnetic tape T or plays back information that has been recorded on the magnetic tape T. At this time, the slide-contact projecting portion 35 of the brake member 32 that is incapable of rotation with respect to the case 12 slidingly contacts the upper surface of the clutch member 44 that rotates with respect to the case 12 together with the reel 28.

When the magnetic tape T is to be rewound onto the reel 28 and the leader block 30 is to be held in the vicinity of the opening 18 in the case 12, the bucket into which the recording tape cartridge 10 has been loaded is caused to rise. Then, the meshing between the reel gear 62 and the drive gear 106 is released, the contact between the release surface 101 and the clutch member 44 is released, and the clutch member 44 moves downward together with the brake member 32 by the energizing force of the compression coil spring 42. Thus, the brake member 32 returns to the brake position where the brake gear 36 meshes with the engagement gear 52. Further, in accompaniment with operation where the brake member 32 and the clutch member 44 move by the energizing force of the compression coil spring 42, the reel 28 also moves downward and returns to its initial state where the lower flange 56 is brought into contact with the annular rib 22 and the reel gear 62 is exposed from the gear opening 20. In this state, the recording tape cartridge 10 is ejected from the bucket.

In manufacturing the reel 28 composing the recording tape cartridge 10, the reel hub 45 including the upper flange 50, and the lower flange member 60 are independently formed by resin molding. The reel hub 45 has the reinforcement ring 68 integrated therewith by insert molding, and the lower flange member 60 has the reel plate 66 integrated therewith by insert molding. Subsequently, the clutch-use boss portion 64 of the lower flange member 60 is fitted into the short circular cylinder portion 55 of the reel hub 45, and the lower flange member 60 is centered (positioned) with respect to the reel hub 45.

Ultrasonic oscillation is generated from an ultrasonic horn in a state where the bottom plate 48, the center portion 58, and the reel plate 66 are sandwiched by a cradle (not shown) and the ultrasonic horn. The cradle is in contact with the reel plate 66 in a region including a back surface portion of the contact portion with the welding-use projections 70 in the center portion 58 (between the reel gear 62 and the respective small hole 66B). The ultrasonic horn is in contact with back surfaces of the welding-use projections 70 in the bottom plate 48 (between the engagement gear 52 and the short circular cylinder portion 55 in the upper surface). Accordingly, the reel hub 45 and the lower flange member 60 are ultrasonic-welded. Thus, the reel hub 45 and the lower flange member 60 are fixed to thereby configure the reel 28 in which the magnetic tape T wound onto the tape take-up surface 46A is protected by the upper flange 50 and the lower flange 56.

In the reel 28, since the reinforcement ring 68 is insert-molded onto the cylindrical wall 46 of the reel hub 45, the rigidity in the radial direction of the reel hub 45 is high. This restrains the deformation of the cylindrical wall 46 by the winding pressure of the magnetic tape T wound onto the tape take-up surface 46A.

Moreover, in the reel 28, since the reinforcement ring 68 does not exist in the range of the thickness 't' of the upper flange 50 at the cylindrical wall 46 of the reel hub 45, the shrinkage of the upper flange 50 in accompaniment with the insert molding is restrained from being deterred by the reinforcement ring 68. Thus, the shrinkage stability of the upper flange 50 formed integrally with the reel hub 45 increases, and dimensional accuracy of the upper flange 50 is assured. Specifically, a position of an outer edge (outer circumferential) portion of the upper flange 50 in the axial direction of the reel hub 45 (hereinafter, referred to as an outer circumferential height) may be kept substantially constant.

Referring to Table 1 showing comparison results with comparative examples, the above-described aspect is further described. Table 1 shows the predetermined amount 'a' from the upper end 68A of the reinforcement ring 68 to the opening end 46B of the cylindrical wall 46, the height 'H' of the reinforcement ring 68, and results 'Δha' of measurement of variation in the outer circumferential height 'h' of the upper flange 50 in the present example and corresponding values for reinforcement rings of the comparative examples. For each of the examples, 10 samples were manufactured. The variation in the outer circumferential height was obtained as follows. An average outer circumferential height 'ha' of the flange over one circuit thereof of each sample with respect to a reference portion is calculated, respectively. Then, a maximum value of difference within the average outer circumferential heights 'ha' of the samples within each example was obtained and is indicated in Table 1 as the variation in the outer circumferential height 'Δha'. That is, the variation indicates a difference (Δha) between an average outer circumferential height 'hamin' of the sample having the lowest average outer circumferential height and an average outer circumferential height 'hamax' of the sample having the highest average outer circumferential height, among the 10 samples of each of the examples.

Figure 8A:
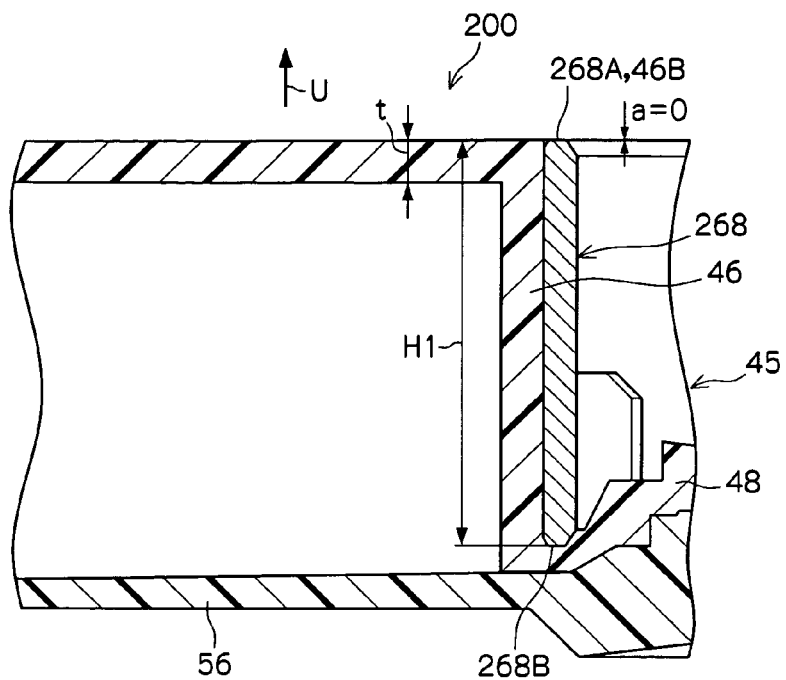
Figure 8B:
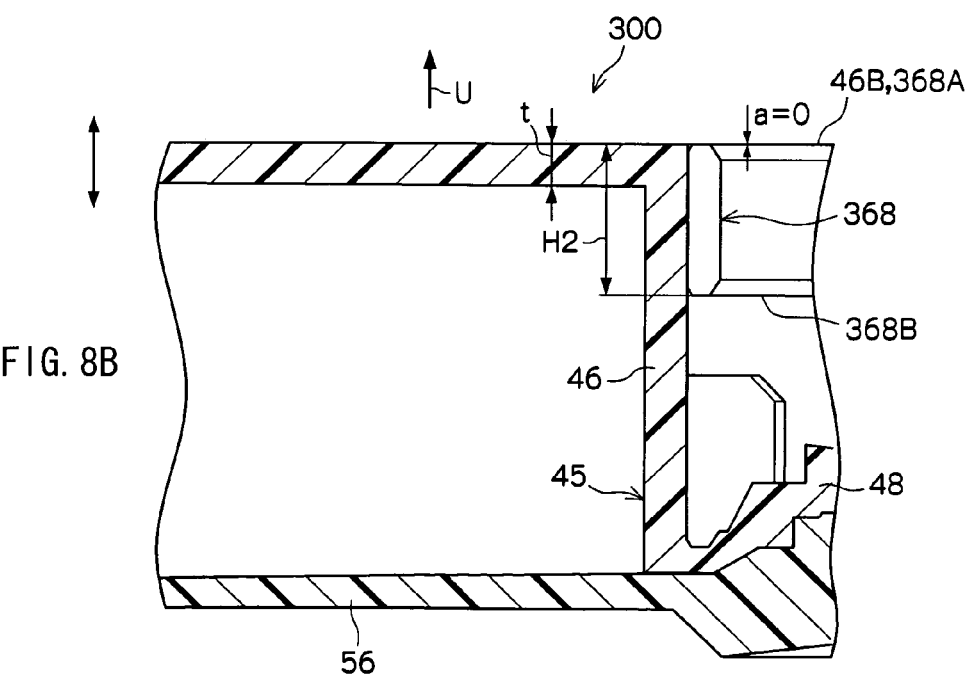

In a reel 200 according to the first comparative example, as shown in FIG. 8A, the upper end 268A of the reinforcement ring 268 coincides with the opening end 46B of the cylindrical wall 46, and the position of the lower end 268B of the reinforcement ring 268 coincides with a position of the lower end 68B of the reinforcement ring 68 of the reel 28 in the present example. That is, in the reel 200, the predetermined amount 'a' equals 0, and a height H1 of the reinforcement ring 268 equals 13.1 mm (=H+t). In a reel 300 according to the second comparative example, as shown in FIG. 8B, the upper end 368A of the reinforcement ring 368 coincides with the opening end 46B of the cylindrical wall 46, and a height H2 of the reinforcement ring 368 was made smaller than the height H of the reinforcement ring 68 in the reel 28 of the present example. In this second comparative example, the predetermined amount a equals 0, and the height H2 of the reinforcement ring 368 equals 5 mm. Furthermore, although illustration is omitted, the third comparative example shows measurement results of a reel resulting from removing the reinforcement ring 68 from the reel 28.

TABLE 1

| Structure | Predetermined amount 'a' | Reinforcement ring height 'H' | Variation in flange outer circumferential height (Δha) |
|---|---|---|---|
| Exemplary embodiment | 1.2 mm = flange thickness t | 11.9 mm | 0.04 mm |
| First comparative example | 0 mm | 13.1 mm | 0.14 mm |
| Second comparative example | 0 mm | 5 mm | 0.13 mm |
| Third comparative example | — | 0 mm (No metal ring) | 0.03 mm |

It may be seen from Table 1 that in the first and second comparative examples in each of which the reinforcement ring 268 or 368 exists in the range of the thickness t of the upper flange 50 in the reel hub 45, the variation in the flange outer circumferential height is large, and that in this case, the variation in the flange outer circumferential height hardly depends on the height H of the reinforcement ring. In contrast, in the reel 28 in which the reinforcement ring 68 does not exist in the range of the thickness t of the upper flange 50 in the reel hub 45, the variation in the flange outer circumferential height is kept remarkably small as compared with the above-described first and second comparative examples. The variation of the flange outer circumferential height in the reel 28 is equivalent to that of the third comparative example not having the reinforcement ring 68, that is, the configuration in which the reinforcement ring 68 does not deter the resin shrinkage.

As described above, in the reel 28, the setting of the reinforcement ring 68 largely improves the rigidity and strength of the reel hub 45 as compared with the third comparative example, and may assure favorable dimensional accuracy of the upper flange 50 as compared with the first and second comparative examples each having the reinforcement ring 268 or 368. That is, in the reel 28, a good balance between the strength of the reel hub 45 and the dimensional stability of the upper flange 50 may be achieved. Moreover, in the reel 28, since the cylindrical wall 46 of the reel hub 45 is reinforced by the reinforcement ring 68 as described above, the deformation of the cylindrical wall 46 by the winding pressure of the magnetic tape T may be restrained, and the deformation (surface wobbling) of the upper flange 50 in accompaniment with the deformation of the cylindrical wall 46 is restrained.

Also, since the reel 28 employs the configuration in which the center portion 58 is joined to the bottom plate 48 to thereby fix the lower flange 56 to the reel hub 45 (cylindrical wall 46), the lower flange 56 is hardly deformed in accompaniment with the deformation of the cylindrical wall 46 by the winding pressure of the magnetic tape T. Particularly, in the reel 28, since the center portion 58 is joined to the bottom plate 48 within the placing region of the reel plate 66 in the lower flange member 60, in other words, since the lower flange 56 is joined to reel hub 45 in the high-rigidity portion (reinforced portion by the reel plate 66) of the lower flange member 60, the deformation such as wobbling in the thickness direction more hardly occurs in the lower flange 56. Thus, in the reel 28, as compared with a configuration in which an inner edge of the lower flange 56 is joined to a lower end surface of the cylindrical wall 46, for example, the surface wobbling in the thickness direction of an outer circumferential edge of the lower flange 56 may be reduced to ⅓ to ½.

As described above, in the reel 28, since the dimensional accuracy of the lower flange 56 with respect to the reel hub 45 is excellent and the deformation (surface wobbling) of the lower flange 56 in accompaniment with the deformation of the cylindrical wall 46 by the winding pressure of the magnetic tape T is restrained, the proper position of the lower flange 56 with respect to the reel hub 45 may be assured in respective states.

In the recording tape cartridge 10 including the above-described reel 28, since the dimensional accuracy of the upper flange 50 and the lower flange 56 with respect to the reel hub 45, that is, the tape take-up surface 46A is excellent, and the surface wobbling (shorten between opposing surfaces) of the upper flange 50 and the lower flange 56 is restrained, the magnetic tape T is prevented from interfering with the upper flange 50 and the lower flange 56 in accompaniment with taking-in and out of the magnetic tape T with respect to the case 12, by which the magnetic tape T is protected.

While in the above-described exemplary embodiment, the example in which the upper flange 50 is integrated with the reel hub 45 is described, the invention is not limited to this, and for example, the invention may be applied to a configuration in which the lower flange 56 is integrated with the reel hub 45.

While in the above-described exemplary embodiment, the example in which the through hole 54, the clutch-use boss portion 64 and the clear hole 66A are formed in the axial center portion of the reel 28 is described, the invention is not limited to this, but these may be modified to carry out the invention. Accordingly, for example, for each of the rotation stopping structure and the rotation stopping release structure of the reel 28 in the recording tape cartridge 10 to which the reel 28 is applied, another structure may be employed.

Furthermore, while in the above-described exemplary embodiment, the example in which the reinforcement ring 68 is located radially inside the cylindrical wall 46 of the reel hub 45 is described, the invention is not limited to this, and for example, the configuration may be such that the reinforcement ring 68 is buried within the thickness direction of the cylindrical wall 46 of the reel hub 45.

A reel of a first aspect of the invention includes a reel hub that is made of a resin material and is formed into a cylindrical shape; a flange that is made of a resin material and is extended integrally outward in a radial direction from one end portion in an axial direction of the reel hub; and a reinforcement ring that is integrally disposed at an inner radial side of a take-up surface for a taken-up object of the reel hub by insert molding, and reinforces the reel hub in the radial direction, wherein a position of an end portion at the flange side in the reel hub axial direction of the reinforcement ring coincides with a position of an end portion at the flange side in the reel hub axial direction of the take-up surface of the reel hub.

In the reel of a first aspect, the flange and the reel hub made of the resin material, and the reinforcement ring are integrated by insert molding with the reinforcement ring arranged within a mold. The one end of the take-up surface of the reel hub is defined by a surface of the flange extended from the reel hub and facing another end side in the axial direction of the reel hub. In this reel, the position of the end portion at the flange side of the reinforcement ring coincides with the position of the end portion at the flange side of the take-up surface of the reel hub. In other words, the reinforcement ring is located in a portion excluding a thickness range of the flange at the one end side in the axial direction of the reel hub.

Thus, in the shrinkage in accompaniment with the insert molding, the shrinkage of the extended portion of the flange in the reel hub is restrained from being deterring by the reinforcement ring. That is, the shrinkage of the resin in the flange becomes stable, so that required dimensional accuracy of the flange may be assured. On the other hand, since at the one end side of the reel hub, in the portion excluding the thickness range of the flange, the reinforcement ring exists at radially inside of the take-up surface, a sufficient reinforcement effect of the reel hub may be obtained.

In the reel of the first aspect, the dimensional accuracy of the flange may be assured in the structure where the reinforcement ring is attached to the reel hub. While the position of the other end portion in the axial direction of the reinforcement ring may be decided in accordance with various limitations, it is desirable that the position of the other end portion is decided, for example, so as to reinforce a wider range of the take-up surface of the reel hub.

According to a second aspect of the invention, in the reel of the first aspect, the reel hub has an opening end on one end side in the axial direction, and the flange is extended integrally outward in the radial direction from the opening end in the reel hub.

In the reel of the second aspect, although the dimension of the flange extended outward in the radial direction from the opening end of the reel hub is easily affected by the resin shrinkage, setting the range for providing the reinforcement ring as described above may assure the required dimensional accuracy.

A reel of a third aspect of the invention includes a reel hub that is made of a resin material and is formed into a cylindrical shape whose one end in an axial direction is an opening end; a flange that is made of a resin material and is extended integrally outward in a radial direction from the opening end of the reel hub; and a reinforcement ring that is integrally disposed at an inner radial side of a take-up surface for a taken-up object of the reel hub by insert molding, and reinforces the reel hub in the radial direction, wherein a position of an end portion at the flange side in the reel hub axial direction of the reinforcement ring is located within a range of the take-up surface in the axial direction of the reel hub.

In the reel of the third aspect, the flange and the reel hub made of the resin material, and the reinforcement ring are integrated by insert molding with the reinforcement ring arranged within a mold. The one end of the take-up surface of the reel hub is defined by a surface of the flange extended from the reel hub and facing the other end side in the axial direction of the reel hub. In this reel, the reinforcement ring reinforces the reel hub in the radial direction. The position of the end portion at the flange side of the reinforcement ring is located within a range of the take-up surface of the reel hub in the axial direction of the reel hub. In other words, the reinforcement ring is not located within the thickness range of the flange at the one end side in the axial direction of the reel hub.

Thus, in the shrinkage in accompaniment with the insert molding, the shrinkage of the extended portion of the flange in the reel hub is restrained from being deterred by the reinforcement ring. That is, although the dimension of the flange extended outward in the radial direction from the opening end of the reel hub is easily affected by the resin shrinkage, setting a range for providing the reinforcement ring as described above may make the shrinkage of the resin of the flange stable and assure the required dimensional accuracy of the flange.

In this manner, in the reel of the third aspect, the dimensional accuracy of the flange may be assured in the structure where the reinforcement ring is attached to the reel hub. While the position of the other end portion in the axial direction of the reinforcement ring may be decided in accordance with various limitations, it is desirable that the position of the other end portion is decided, for example, so as to reinforce a wider range of the take-up surface of the reel hub.

According to a fourth aspect of the invention, in the reel of the third aspect, the position of the end portion at the flange side in the axial direction of the reinforcement ring coincides with a position of the end portion at the flange side in the axial direction of the take-up surface of the reel hub.

In the reel of the fourth aspect, the position of the end portion at the flange side of the reinforcement ring coincides with the position of the end portion at the flange side of the take-up surface of the reel hub in the axial direction of the reel hub. In other words, since at the one end side of the reel hub, the reinforcement ring exists at the portion excluding the thickness range of the flange and at radially inside of the take-up surface, a sufficient reinforcement effect of the reel hub may be obtained.

According to a fifth aspect of the invention, in the reel of any one of the second to fourth aspects, the reel hub has a bottom plate portion extended inward in the radial direction from the other end portion in the axial direction, and the reel further includes a flange member having a center portion joined to the bottom plate portion of the reel hub, and a flange portion that is opposed to the flange and extends from the center portion.

In the reel of the fifth aspect, the center portion of the flange member extends from the bottom plate portion of the reel hub and the flange portion is formed so as to oppose to the flange formed integrally with the reel hub. In this reel, since the cylindrical shape member of the reel hub and the flange member are not joined, the deformation of the flange portion, which may be accompanied with the deformation of the cylindrical shape portion of the reel hub by the winding pressure of the taken-up object, is restrained. This assures dimensional accuracy of the flange portion in a state where the taken-up object is taken up.

A reel of a sixth aspect of the invention includes a reel hub that is made of a resin material and is formed into a cylindrical shape; a flange that is made of a resin material and is extended integrally outward in a radial direction from one end portion in an axial direction of the reel hub; a reinforcement ring that is integrally disposed at an inner radial side of a take-up surface for a taken-up object of the reel hub by insert molding, and reinforces the reel hub in the radial direction; and a bottom plate portion extended inward in the radial direction from the other end portion in the axial direction of the reel hub, wherein a position of an end portion at the flange side in the reel hub axial direction of the reinforcement ring coincides with a position of an end portion at the flange side in the reel hub axial direction of the take-up surface of the reel hub; and an end portion at the opposite side from the flange in the reel hub axial direction of the reinforcement ring is buried in the bottom plate portion.

In the reel of the sixth aspect, since at the one end side of the reel hub, the reinforcement ring exists at the portion excluding the thickness range of the flange and radially inside the take-up surface, a sufficient reinforcement effect of the reel hub may be obtained.

Moreover, in the shrinkage in accompaniment with the insert molding, the shrinkage of the extended portion of the flange in the reel hub is restrained from being deterred by the reinforcement ring. That is, the shrinkage of the resin in the flange becomes stable, so that required dimensional accuracy of the flange may be assured.

Further, since the other end portion in the axial direction of the reinforcement ring is buried in the bottom plate portion, a wider range of the take-up surface of the reel hub may be reinforced.

Thus, in the reel of the sixth aspect, in the structure where the reinforcement ring is attached to the reel hub, dimensional accuracy of the flange may be assured.

According to a seventh aspect of the invention, the reel of the sixth aspect further includes a flange member having a center portion joined to the bottom plate portion of the reel hub, and a flange portion that is opposed to the flange and extends from the center portion.

In the reel of the seventh aspect, the center portion of the flange member extends from the bottom plate portion of the reel hub and the flange portion opposes to the flange formed integrally with the reel hub is formed. That is, since the cylindrical shape portion of the reel hub and the flange member are not joined, the deformation of the flange portion, which may be accompanied with the deformation of the cylindrical shape portion of the reel hub by the winding pressure of the taken-up object, is restrained. This assures dimensional accuracy of the flange portion in the state where the taken-up object is taken up.

According to an eighth aspect of the invention, the reel of the fifth or seventh aspect, a plate made of metal is attached to a portion of the center portion of the flange member, the portion including a range in which the center portion of the flange member is joined to the bottom plate portion of the reel hub.

In the reel of the eighth aspect, since the center portion of the flange member is reinforced by the metal plate to be the high-rigidity portion, and is joined to the bottom plate portion of the reel hub, more favorable dimensional accuracy of the flange portion may be assured.

A recording tape cartridge of a ninth aspect of the invention includes a case; and the reel of any one of the first to eighth aspects in which a recording tape is wound onto the take-up surface of the reel hub as the taken-up object, and the recording tape is housed in the case so as to be capable of being pulled out and taken up.

In the recording tape cartridge of the ninth aspect, the recording tape wound onto the reel hub is pulled out from the case to read and write (alternatively, read or write) information. Since in this recording tape cartridge, the reel of any one of the first to eighth aspects is applied, dimensional accuracy of the flange is assured. This prevents the interference between the recording tape and the flanges in accompaniment with the taking-in and out with respect to the case, so that the recording tape is protected.

In this manner, in the recording tape cartridge of the ninth aspect, the recording tape may be protected favorably by applying the reel.

As described above, the reel according to the invention has an excellent effect that a proper position of the flange with respect to the reel hub may be assured. Moreover, the recording tape cartridge according to the invention has an excellent effect that the recording tape may be favorably protected by applying the reel.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reel comprising:
a reel hub made of a resin material and being formed into a cylindrical shape having one end in an axial direction be an opening end, and another end portion in the opposite axial direction;
a flange made of a resin material and being molded as a single piece with the reel hub so as to extend integrally outward in a radial direction from the opening end of the reel hub;
a reinforcement ring integrally disposed at an inner radial side of a take-up surface for a taken-up object of the reel hub by insert molding, and reinforcing the reel hub in the radial direction; and
a bottom plate portion being extended integrally inward in a radial direction from the other end portion of the reel hub,
wherein a position of an end portion at the flange side in the reel hub axial direction of the reinforcement ring is located within a range of the take-up surface in the axial direction of the reel hub, such that the reinforcement ring does not overlap with a thickness of the flange, and such that none of the resin material of the flange and the reel hub is in contact with the end portion at the flange side in the reel hub axial direction of the reinforcement ring.

2. The reel of claim 1, wherein the position of the end portion at the flange side in the reel hub axial direction of the reinforcement ring coincides with a position of an end portion at the flange side in the axial direction of the take-up surface of the reel hub.

3. The reel of claim 1, wherein:
the reel further comprises a flange member having a center portion joined to the bottom plate portion of the reel hub, and a flange portion that is opposed to the flange and extends from the center portion.

4. The reel of claim 2, wherein:
the reel hub has a bottom plate portion extended inward in the radial direction from the other end portion in the axial direction; and
the reel further comprises a flange member having a center portion joined to the bottom plate portion of the reel hub, and a flange portion that is opposed to the flange and extends from the center portion.

5. A reel comprising:
a reel hub made of a resin material, being formed into a cylindrical shape, and having one end in an axial direction be an opening end;
a flange made of a resin material and being molded as a single piece with the reel hub so as to extend integrally outward in a radial direction from one end portion in an axial direction of the reel hub;
a reinforcement ring integrally disposed at an inner radial side of a take-up surface for a taken-up object of the reel hub by insert molding, and reinforcing the reel hub in the radial direction; and
a bottom plate portion extended inward in the radial direction from the other end portion in the axial direction of the reel hub,
wherein a position of an end portion at the flange side in the reel hub axial direction of the reinforcement ring coincides with a position of an end portion at the flange side in the reel hub axial direction of the take-up surface of the reel hub, such that the reinforcement ring does not overlap with a thickness of the flange, and such that none of the resin material of the flange and the reel hub is in contact with the end portion at the flange side in the reel hub axial direction of the reinforcement ring, and an end portion of the reinforcement ring at the opposite side from the flange of the reel hub axial direction is buried in the bottom plate portion.

6. The reel of claim 5, further comprising a flange member having a center portion joined to the bottom plate portion of the reel hub, and a flange portion that is opposed to the flange and extends from the center portion.

7. The reel of claim 4, wherein a plate made of metal is attached to a portion of the center portion of the flange member, the portion including a range in which the center portion of the flange member is joined to the bottom plate portion of the reel hub.

8. A recording tape cartridge comprising:
a case; and
a reel hub made of a resin material, being formed into a cylindrical shape, and having one end in an axial direction be an opening end;
a flange made of a resin material and being molded as a single piece with the reel hub so as to extend integrally outward in a radial direction from one end portion in an axial direction of the reel hub; and
a reinforcement ring integrally disposed at an inner radial side of a take-up surface for a taken-up object of the reel hub by insert molding, and reinforcing the reel hub in the radial direction; and
a bottom plate portion extended inward in the radial direction from the other end portion in the axial direction of the reel hub,
wherein a position of an end portion at the flange side in the reel hub axial direction of the reinforcement ring coincides with a position of an end portion at the flange side in the reel hub axial direction of the take-up surface of the reel hub, such that the reinforcement ring does not overlap with a thickness of the flange, and such that none of the resin material of the flange and the reel hub is in contact with the end portion at the flange side in the reel hub axial direction of the reinforcement ring, and
wherein a recording tape is wound onto the take-up surface of the reel hub as the taken-up object, and the recording tape is housed in the case so as to be capable of being pulled out and taken up.

9. A recording tape cartridge comprising:
a case; and
a reel hub made of a resin material, being formed into a cylindrical shape, and having one end in an axial direction be an opening end;
a flange made of a resin material and being molded as a single piece with the reel hub so as to extend integrally outward in a radial direction from one end portion in an axial direction of the reel hub;
a reinforcement ring integrally disposed at an inner radial side of a take-up surface for a taken-up object of the reel hub by insert molding, and reinforcing the reel hub in the radial direction; and
a bottom plate portion extended inward in the radial direction from the other end portion in the axial direction of the reel hub,
wherein a position of an end portion at the flange side in the reel hub axial direction of the reinforcement ring coincides with a position of an end portion at the flange side in the reel hub axial direction of the take-up surface of the reel hub, such that the reinforcement ring does not overlap with a thickness of the flange, and such that none of the resin material of the flange and the reel hub is in contact with the end portion at the flange side in the reel hub axial direction of the reinforcement ring, and an end portion of the reinforcement ring at the opposite side from the flange of the reel hub axial direction is buried in the bottom plate portion, and wherein a recording tape is wound onto the take-up surface of the reel hub as the taken-up object, and the recording tape is housed in the case so as to be capable of being pulled out and taken up.

* * * * *